United States Patent
Winberg et al.

(10) Patent No.: US 9,352,789 B2
(45) Date of Patent: May 31, 2016

(54) TORQUE BOX WITH SHEAR PLANES AT INNER JOINT

(71) Applicant: Tesla Motors, Inc., Palo Alto, CA (US)

(72) Inventors: N. Petter Winberg, Hayward, CA (US); Tom Spencer, San Francisco, CA (US); Sachin Shrimant Sawant, Newark, CA (US); Malcolm Burgess, Mountain View, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 14/255,889

(22) Filed: Apr. 17, 2014

(65) Prior Publication Data

US 2015/0298744 A1    Oct. 22, 2015

(51) Int. Cl.
  *B62D 25/08* (2006.01)
  *B62D 27/02* (2006.01)
  *B62D 29/00* (2006.01)

(52) U.S. Cl.
  CPC ............ *B62D 27/023* (2013.01); *B62D 25/082* (2013.01); *B62D 29/008* (2013.01)

(58) Field of Classification Search
  CPC .... B62D 25/082; B62D 25/20; B62D 21/152; B62D 27/023; B60K 1/04; B60K 2001/0438; B60R 19/34
  USPC ................................ 296/203.04, 209, 203.03
  See application file for complete search history.

(56) References Cited

U.S. PATENT DOCUMENTS

| | | | |
|---|---|---|---|
| 3,604,736 A * | 9/1971 | Vance .......................... | 52/588.1 |
| 4,618,163 A | 10/1986 | Hasler | |
| 5,320,403 A | 6/1994 | Kazyak | |
| 5,861,544 A * | 1/1999 | Kosaraju et al. ............. | 73/12.09 |
| 6,299,240 B1 | 10/2001 | Schroeder et al. | |
| 7,614,684 B2 * | 11/2009 | Yasuhara ............. | B60K 15/063 180/69.4 |
| 7,806,450 B2 * | 10/2010 | Johnson et al. ............... | 296/1.08 |
| 8,328,272 B2 * | 12/2012 | Fujimura ........... | B62D 25/2027 296/187.11 |
| 8,641,133 B1 * | 2/2014 | Scaringe .............. | B62D 23/005 296/193.03 |
| 2002/0063445 A1 | 5/2002 | Takeuchi | |
| 2004/0145216 A1 | 7/2004 | Kuroda et al. | |
| 2012/0175897 A1 | 7/2012 | Rawlinson et al. | |
| 2012/0175899 A1 | 7/2012 | Gadhiya et al. | |
| 2012/0175900 A1 | 7/2012 | Rawlinson | |
| 2012/0175916 A1 | 7/2012 | Rawlinson et al. | |
| 2013/0088045 A1 | 4/2013 | Charbonneau et al. | |
| 2013/0161933 A1 | 6/2013 | Marten et al. | |
| 2013/0300138 A1 | 11/2013 | Banasiak et al. | |

FOREIGN PATENT DOCUMENTS

| | | |
|---|---|---|
| EP | 1209068 | 5/2002 |
| JP | 2000318645 | 11/2000 |

OTHER PUBLICATIONS

International search report in application PCT/US2015/026329, Aug. 30, 2015, 11 pages.

* cited by examiner

*Primary Examiner* — Pinel Romain
(74) *Attorney, Agent, or Firm* — J. Richard Soderberg

(57) ABSTRACT

A torque box for a vehicle includes: first and second clamshells joined to each other at respective top and bottom edges and configured to form at least first and second enclosures with an inner joint in between, the first and second enclosures configured to provide top and bottom shear planes at the top and bottom edges, respectively, and at least first and second shear planes at the inner joint.

21 Claims, 7 Drawing Sheets

TORQUE BOX WITH SHEAR PLANES AT INNER JOINT

BACKGROUND

Vehicles are generally designed with an eye toward the possibility of forceful impact, whether that be the result of the vehicle hitting another stationary or moving object, or due to the vehicle being run into by something (e.g., another vehicle). For this reason, crash-absorbing structures can be provided in the front and rear of the vehicle. One purpose of crash-absorbing structures can be to direct crash forces away from certain areas of the vehicle, such as the passenger compartment or sensitive components, such as an energy storage (e.g., a battery pack or a fuel tank).

SUMMARY

In a first aspect, a torque box for a vehicle includes: first and second clamshells joined to each other at respective top and bottom edges and configured to form at least first and second enclosures with an inner joint in between, the first and second enclosures configured to provide top and bottom shear planes at the top and bottom edges, respectively, and at least first and second shear planes at the inner joint.

Implementations can include any or all of the following features. The inner joint is formed by a ridge on at least one of the first and second clamshells, the ridge facing another of the first and second clamshells. The inner joint comprises a substantially vertical surface separating the first and second enclosures. At least a central portion of the first enclosure has a substantially rectangular cross-section, and wherein the first shear plane is formed by a bottom of the substantially rectangular cross-section. At least a central portion of the second enclosure has a substantially rectangular cross-section, and wherein the second shear plane is formed by a top of the substantially rectangular cross-section. The respective top edges of the first and second clamshells form a top joint that traverses the top shear surface. The top joint has an angle on the top shear surface. The respective bottom edges of the first and second clamshells are arced. The bottom shear plane is formed by only one of the first and second clamshells. The one of the first and second clamshells is positioned inward in the vehicle. The torque box further includes an additional inner plane strengthening at least one of the first and second clamshells. The additional inner plane is attached to at least one from the group consisting of: the top shear plane, the first shear plane, the second shear plane, and the bottom shear plane. The torque box further includes a socket at one end thereof, the socket facing forward in the vehicle. The socket is configured to receive an end of a crush rail of the vehicle, or an adapter for the crush rail. The torque box further includes an attachment at another end thereof, the attachment configured to attach the torque box to a side sill of the vehicle. The first and second clamshells are joined at least by an adhesive at the inner joint. The first and second clamshells are joined at least by an adhesive at the respective top and bottom edges. The respective top and bottom edges comprise flanges. The first and second clamshells are cast from aluminum.

DETAILED DESCRIPTION

This document describes examples of systems and techniques for channeling impact force from a vehicle crush rail (e.g., at the front of the vehicle) toward a designated part of the vehicle structure (e.g., a side sill) that is not aligned with the crush rail.

Figure 1:
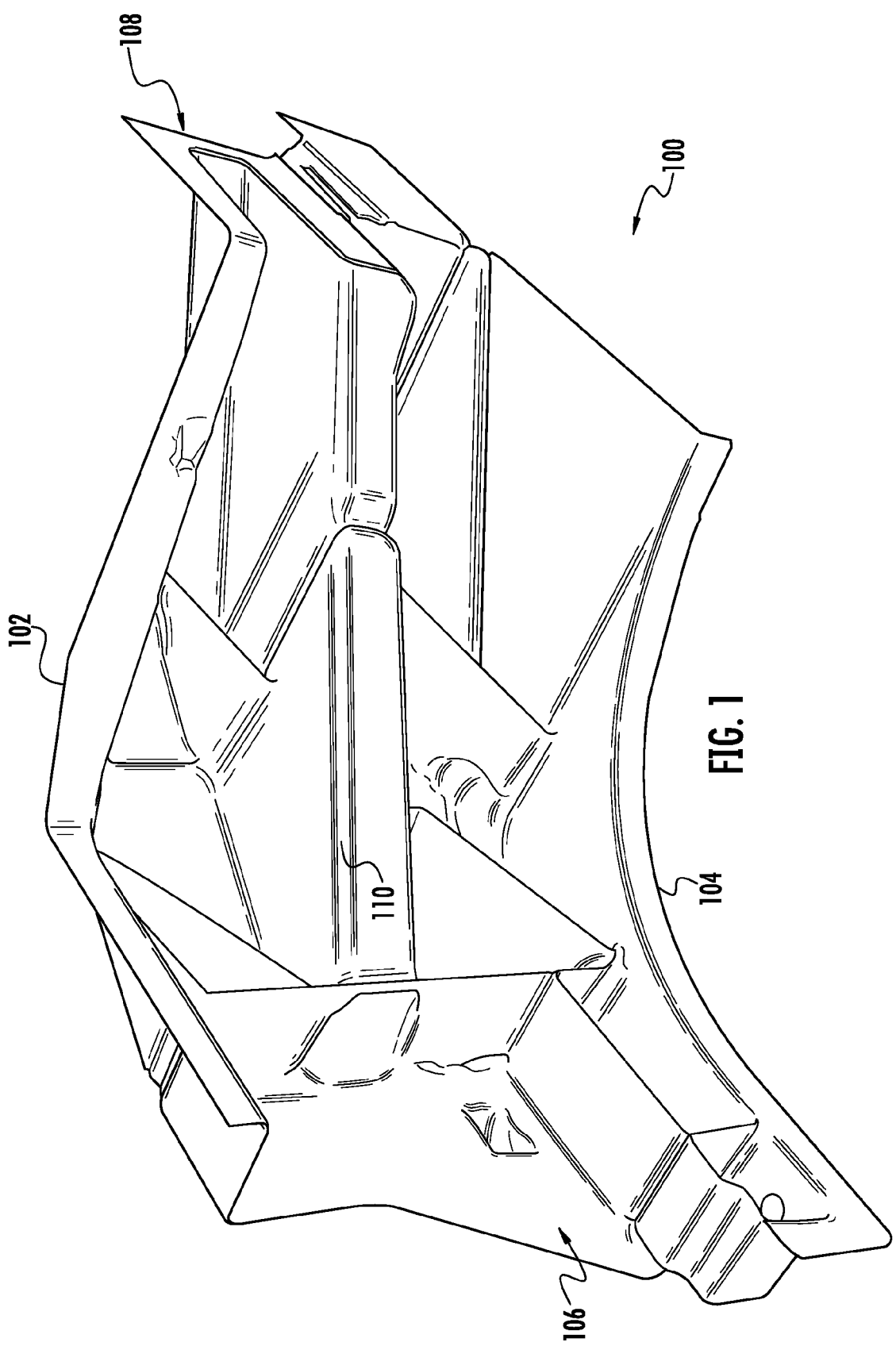
FIG. 1 shows an example of an inner clamshell for a torque box.

FIG. 1 shows an example of an inner clamshell 100 for a torque box. That is, the torque box can be configured so as to be assembled from two or more separate components, and the clamshell 100 can be the inner one of such components when mounted on the vehicle. The inner clamshell can be manufactured by any suitable technique, including, but not limited to, by high-pressure die casting. For example, the inner clamshell can be made from aluminum.

The inner clamshell 100 has a top edge 102 and a bottom edge 104. The edges can have any suitable shape considering the opposing clamshell and the intended structure and performance of the torque box. In some implementations, either or both of the edges can include a flange configured to abut corresponding structure on the opposite clamshell (e.g., another flange). For example, the top edge here has generally linear portions separated by an angle, whereas the bottom edge has an arced portion.

The inner clamshell 100 has a socket portion 106 configured to form a socket of a particular shape when the torque box is assembled. The socket is configured to receive one end of a crush rail, such as one that is mounted in the front end of the vehicle and designed to absorb crash forces and direct them rearward. The socket can have a generally octagonal or rectangular shape, to name just two examples, to accommodate the particular shape of the end of the crush rail.

The inner clamshell 100 has an attachment portion 108 configured to form an attachment of the assembled torque box onto another structure. In some implementations, this end of the torque box (e.g., the rear end) will be attached to a side sill of the vehicle, thereby allowing impact force to be directed through the torque box and into the side sill.

The inner clamshell 100 has at least one ridge 110 between the top and bottom edges 102-104. The ridge is designed to face toward the other clamshell when the torque box is assembled. Here, the ridge comprises upper and lower generally horizontal surfaces joined by a generally vertical ridge surface. The ridge can extend over the entire length of the inner clamshell (i.e., from the socket portion 106 to the attachment portion 108) of over only a part thereof.

Figure 2:
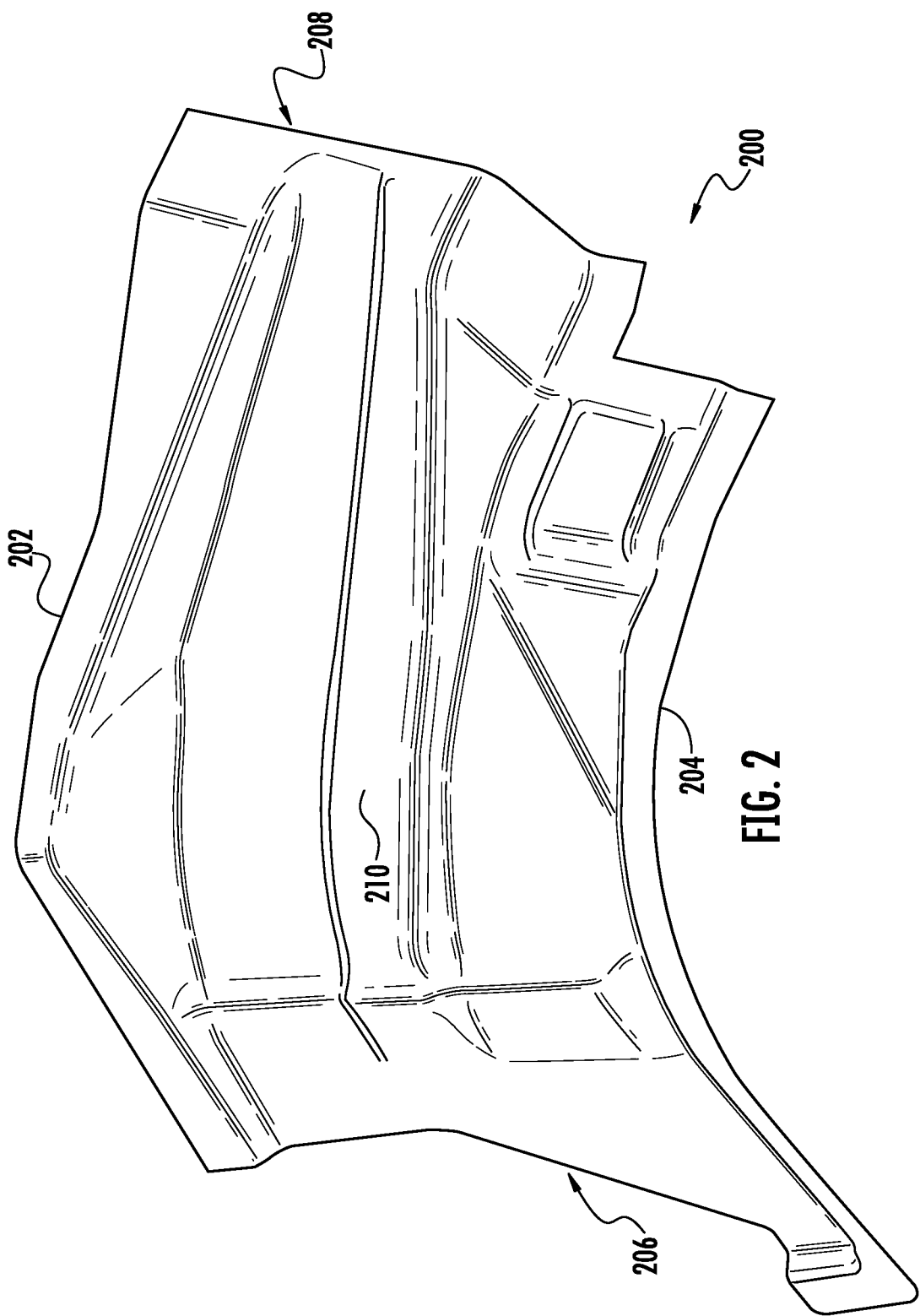
FIG. 2 shows an example of an outer clamshell for a torque box.

FIG. 2 shows an example of an outer clamshell 200 for a torque box. In some implementations, the outer clamshell is configured to be positioned as the outer one of two or more clamshells designed to be assembled into a torque box. For example, the outer clamshell 200 can be combined with the inner clamshell 100 (FIG. 1). The outer clamshell can be made using any suitable technique, such as high pressure die casting.

The outer clamshell 200 can have a top edge 202, a bottom edge 204, a socket portion 206 and an attachment portion 208.

That is, with reference again briefly to FIG. 1, in some implementations the top edge can correspond to the top edge 102, and the bottom edge 204 to the bottom edge 104. Moreover, the socket portion 206 together with the socket portion 106 can form a socket for a crush rail, and the attachment portion 208 together with the attachment portion 108 can form the attachment to the vehicle's side sill. In such implementations, the top and bottom edges can comprise flanges, and/or the bottom edge can have an arced shape.

The outer clamshell 200 has at least one ridge 210 between the top and bottom edges 202-204. The ridge is designed to face toward the other clamshell (e.g., the inner one) when the torque box is assembled. Here, the ridge comprises upper and lower generally horizontal surfaces joined by a generally vertical ridge surface. The ridge can extend over the entire length of the outer clamshell (i.e., from the socket portion 206 to the attachment portion 208) of over only a part thereof.

Figure 3:
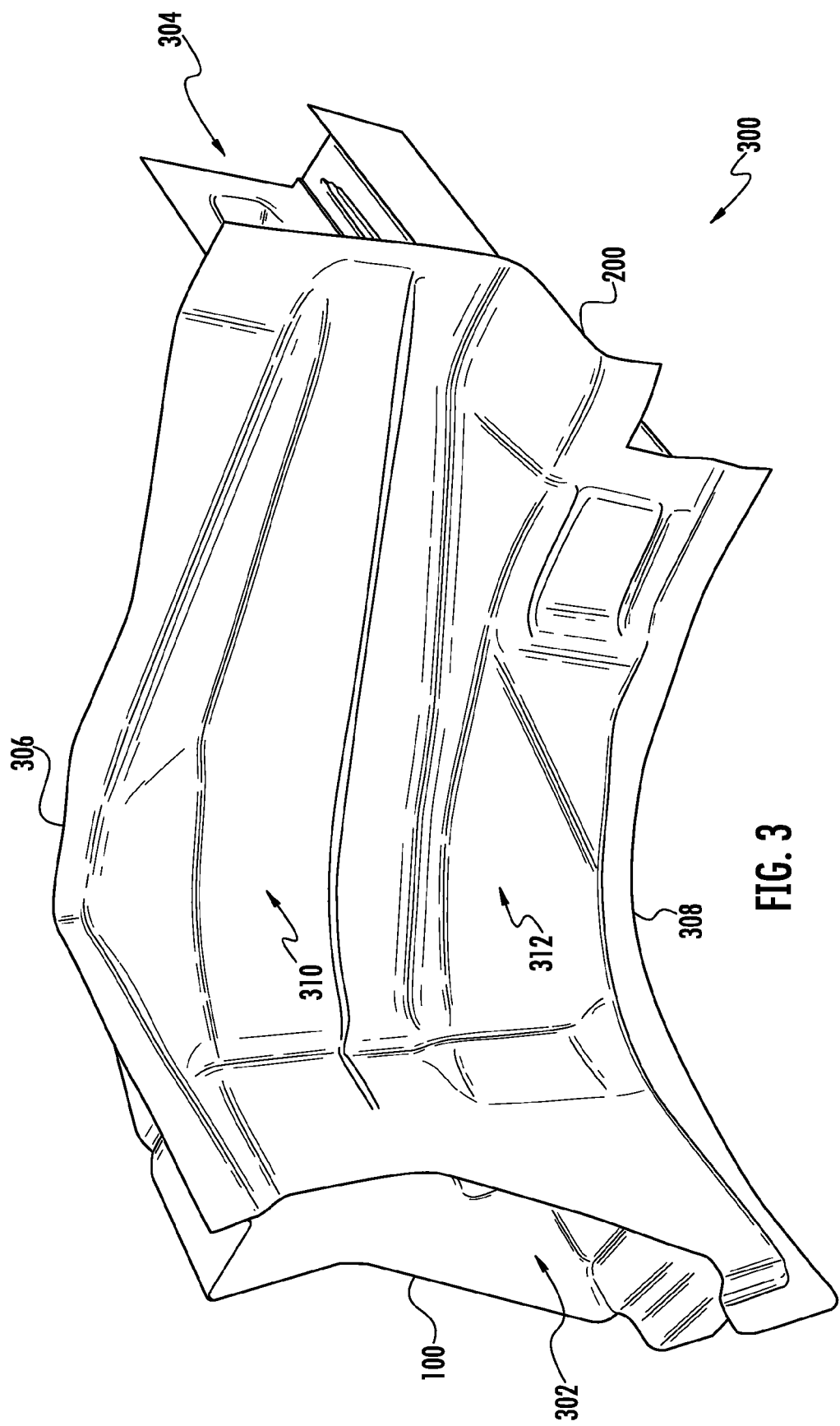
FIG. 3 shows an example of a torque box having the inner and outer clamshells of FIGS. 1-2.

FIG. 3 shows an example of a torque box 300 having the inner and outer clamshells 100 and 200 of FIGS. 1-2. As such, the torque box provides a socket 302 at one of its ends (e.g., the front end), and an attachment 304 at another end (e.g., the rear end). The socket is configured to receive an end of a crush rail of the vehicle, or an adapter for the crush rail. The attachment, in turn, is configured to be mounted to the vehicle's side sill. The clamshells can be attached to each other by any suitable technique, including, but not limited to, by an adhesive applied along at least one of the top or bottom edges, and/or by rivets. For example, self-piercing rivets can be used.

The torque box 300 has a top joint 306 and a bottom joint 308 where respective edges of the inner and outer clamshells meet. In some implementations, the top joint can traverse a top of the torque box, such as in form of generally linear portions with an angle between them. In some implementations, the bottom joint comprises an arced shape.

The torque box 300 forms at least a first enclosure 310 and a second enclosure when assembled. The enclosures can serve to provide structural integrity to the torque box, to name just one example. Either or both of the enclosures can extend over the entire length of the torque box (i.e., from the socket 302 to the attachment 304) of over only a part thereof.

Figure 4:
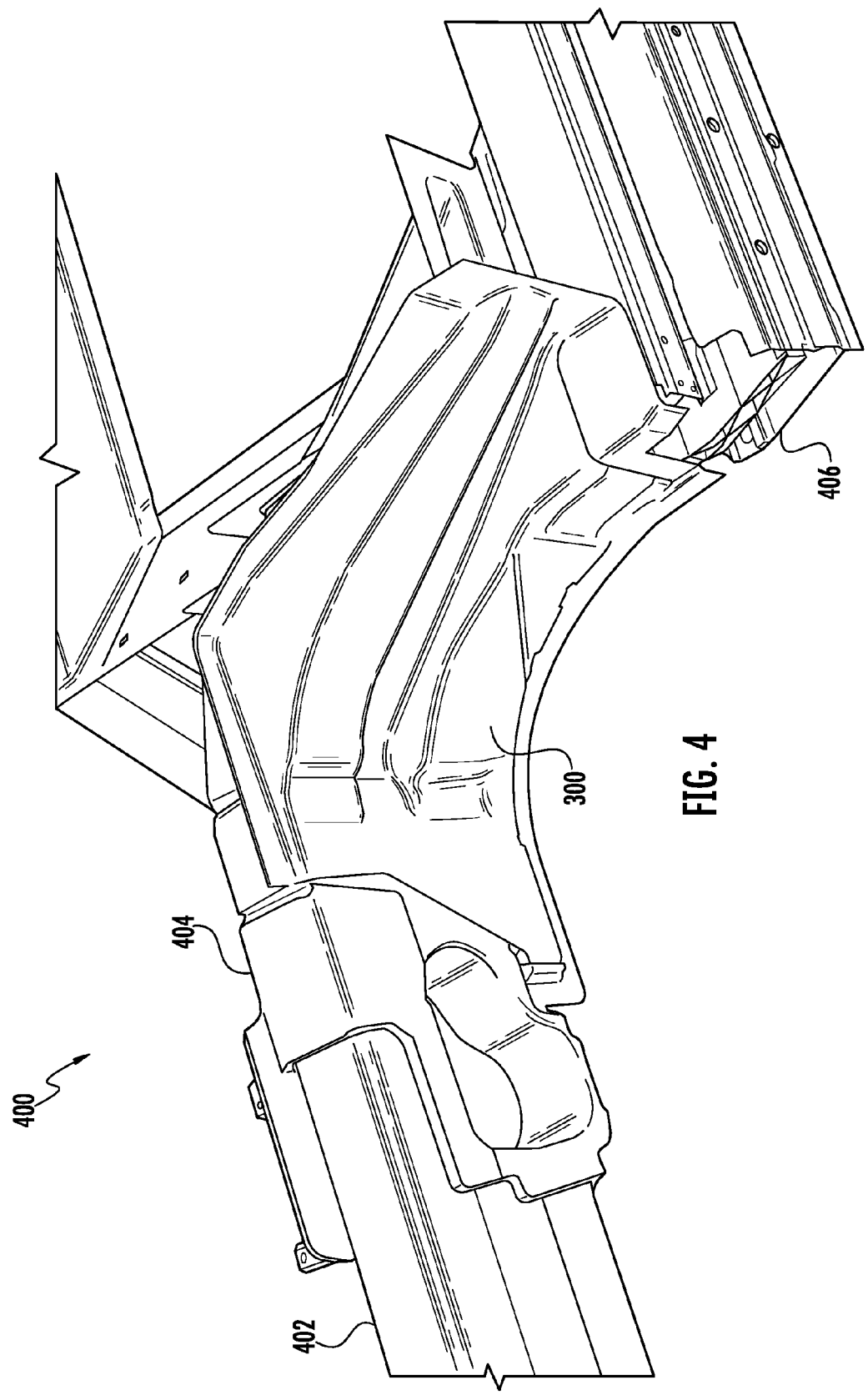
FIG. 4 shows an example of the torque box of FIG. 3 mounted in a vehicle front end.

FIG. 4 shows an example of the torque box 300 of FIG. 3 mounted in a vehicle front end 400. Particularly, the front end here further has a crush rail 402 configured so that one end thereof fits into an adapter component 404. The adapter component, in turn, has a plug at its other end that fits into the socket of the torque box. For example, the adapter plug can be attached to the socket portion of the inner clamshell by way of adhesive, bolts and rivets. The adapter component can have different plugs corresponding to different shapes or sizes of sockets. As such, the adapter component can be said to perform adaptation between crush rails and torque boxes. As another example, the adapter component can have an opening through it that accommodates a drive shaft or other axle of the vehicle.

A vehicle side sill 406 is here an extruded component (e.g., of aluminum) that extends along at least part of the vehicle's side. In some implementations, the side sill can provide rigidity against vertical loads, and/or impact protection against side forces. For example, when mounted on an electric vehicle that has an energy storage (e.g., a battery pack) located underneath the vehicle body, the side sill can serve to protect the energy storage against damage.

The side sill 406 can also, moreover, serve to convey front impact forces rearward past the energy storage. For this and other purposes, the torque box 300 is mounted onto the side sill by way of the attachment at one of its ends. Similarly, a torque box positioned toward the rear of the vehicle can be mounted onto another end of the side sill to allow it to convey rear impact forces forward past the energy storage.

Figure 5:
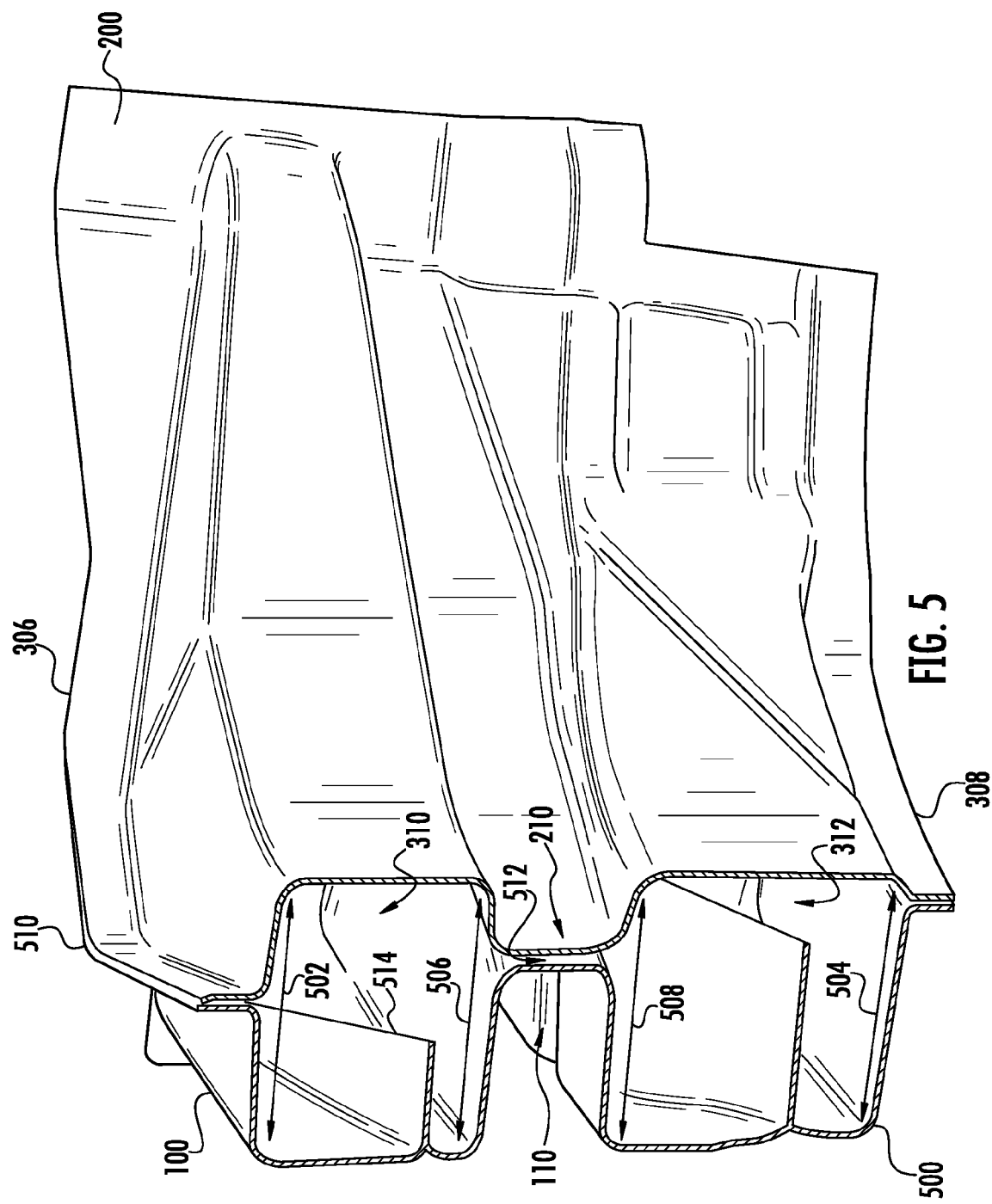
FIG. 5 shows an example of a cross-section profile of the torque box of FIG. 3.

FIG. 5 shows an example of a cross-section profile 500 of the torque box of FIG. 3. This illustration shows the first enclosure 310 and the second enclosure 312 that were mentioned in an earlier example. The illustration also shows that the torque box has multiple shear surfaces. For example, a top shear surface 502 is schematically illustrated by an arrow, and so is a bottom shear surface 504. Similarly, examples of first and second shear surfaces 506-508 are also illustrated. In some implementations, some or all of the shear surfaces are substantially planar and can then be considered a shear plane.

The first enclosure 310 can have a generally rectangular shape and can have the first shear surface 506 at the bottom thereof. As another example, the second enclosure 312 can have a generally rectangular shape and can have the second shear surface 508 at the top thereof.

Each of the shear surfaces 502-508 can be formed by either of the clamshells alone or jointly by both clamshells. For example, the bottom shear surface 504 is here formed solely by the inner clamshell 100, whereas the first shear surface 506 is formed by the adjoining structures of both clamshells 100 and 200.

Either or both of the top and bottom joints 306-308 can traverse a corresponding shear surface. For example, the top joint 306 here comprises essentially linear portions separated by an angle 510 so as to traverse the top shear surface. As another example, the bottom joint 308 has a generally arced shape and traverses the bottom shear surface 504.

Either or both of the enclosures 310-312 can be formed by at least one ridge on a corresponding clamshell. In some implementations, the ridges 110 and 210 have mating surfaces that form an inner joint 512. The inner joint can have any suitable shape. In some implementations, the inner joint can include a substantially vertical surface that separates the first and second enclosures 310-312. At the inner joint the respective clamshells can be attached to each other in any suitable way, such as by adhesive.

Accordingly, the cross-section profile 500 can provide the torque box with four individual shear surfaces (e.g., shear planes), while leaving the majority of the torque box material closer to the outer surfaces of the respective clamshells. For example, such features can make the torque box stronger.

At least one additional inner plane 514 can be provided. The additional inner plane can be formed by either or both of the corresponding clamshells and can provide further structural integrity to the torque box. For example, an additional inner plane can be provided on one or more of the shear surfaces 502-508.

Torque boxes described herein can provide valuable benefits in collisions. In some implementations, a torque box can also connect to a hinge pillar and cowl side of the vehicle. For example, this can allow the torque box to serve a useful role in an offset deformable barrier crash mode, and/or in a small overlap frontal crash mode.

Figure 6:
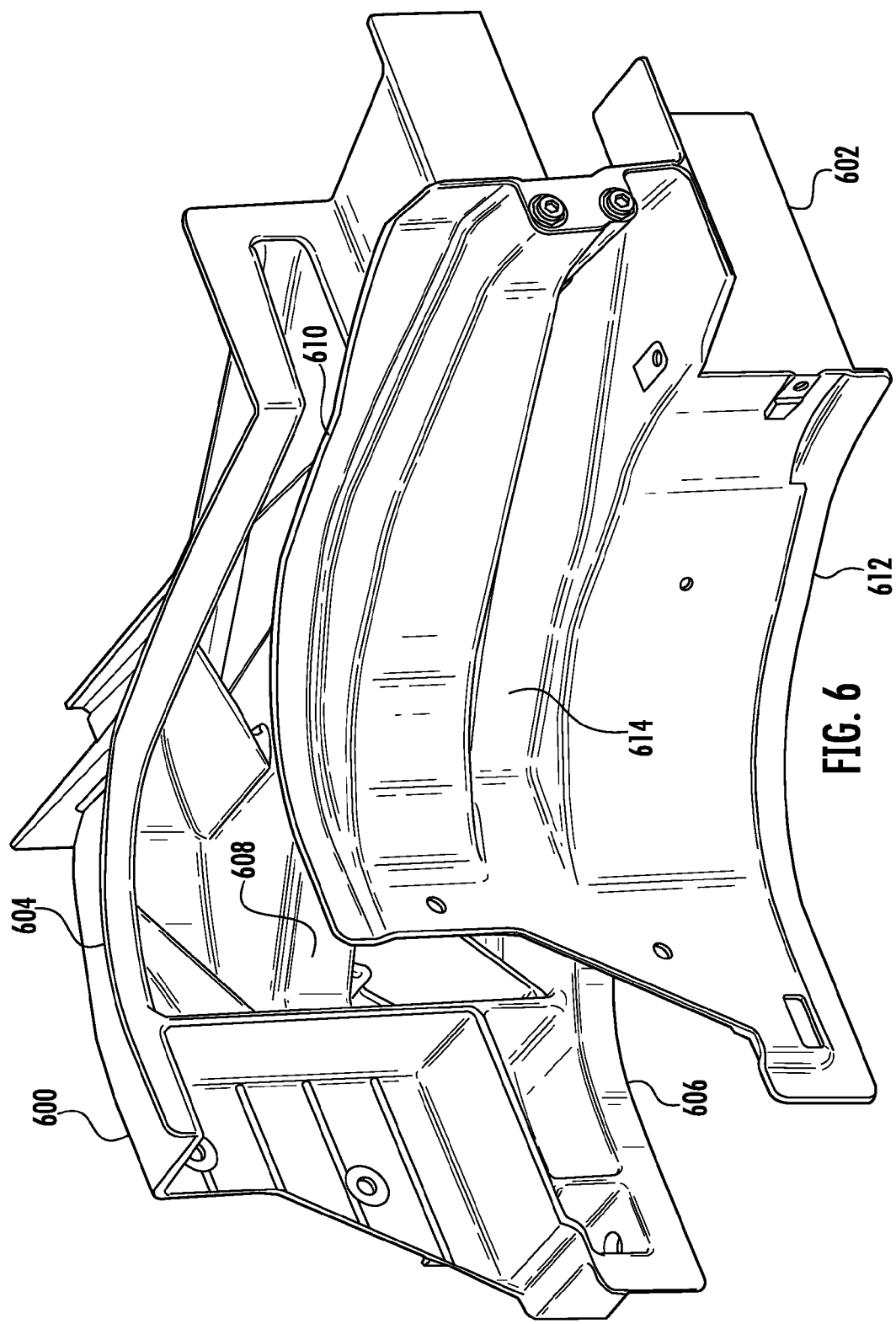
FIG. 6 shows another example of inner and outer clamshells.

FIG. 6 shows another example of inner and outer clamshells 600 and 602. The clamshells are shown spaced apart from each other to make some features visible. When assembled together, the clamshells form a torque box suitable for being mounted in a vehicle. Beginning with the inner clamshell, it has top and bottom edges 604 and 606, and a ridge 608. For example, the top and bottom edges allow attachment to another clamshell, and the ridge serves to form enclosures and/or shear surfaces. Turning now to the outer clamshell 602, it has top and bottom edges 610 and 612, and a ridge 614. Similarly, the top and bottom edges allow attachment to the other clamshell, and the ridge serves to form enclosures and/or shear surfaces. In this implementation, the top edges 604 and 610 comprise curved flanges. Similarly, the bottom edges 606 and 612 here comprise curved flanges.

Figure 7:
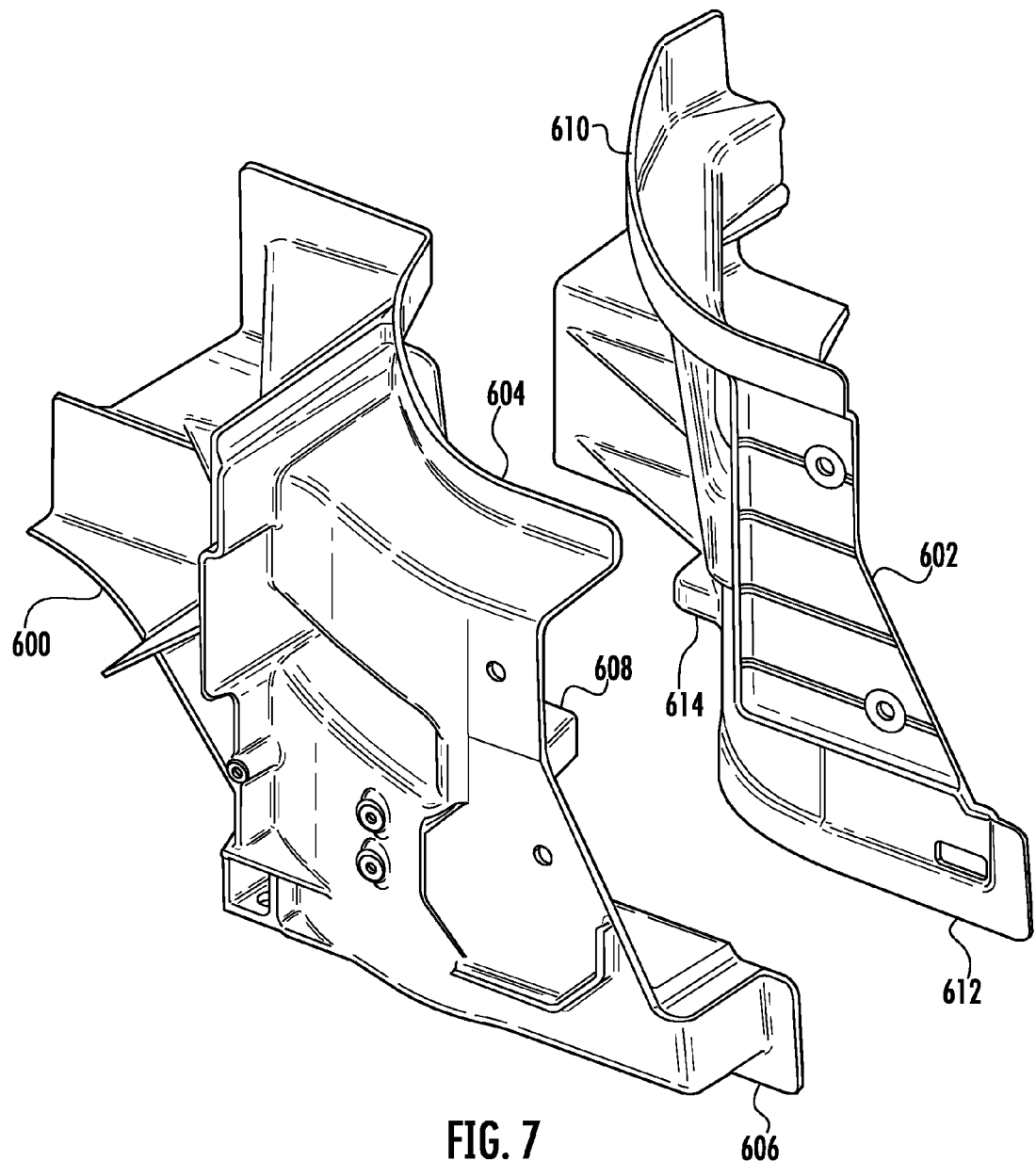
FIG. 7 shows another view of the inner and outer clamshells of FIG. 6.

FIG. 7 shows another view of the inner and outer clamshells 600 and 602 of FIG. 6. This view illustrates how the respective top edges 604 and 610 allow the clamshells to be attached along a top joint, and similarly how the respective bottom edges 606 and 612 allow the clamshells to be attached along a bottom joint. In such assembly, enclosures are formed between the clamshells and respective shear surfaces are formed. For example, top and bottom shear surfaces can be formed near the respective top and bottom joints. As another example, shear surfaces can be formed by the ridges 608 and 614.

A number of implementations have been described as examples. Nevertheless, other implementations are covered by the following claims.

What is claimed is:

1. A torque box for a vehicle, the torque box comprising: first and second clamshells joined to each other at respective top and bottom edges and configured to form at least first and second enclosures with an inner joint in between, the first and second enclosures configured to provide top and bottom shear planes at the top and bottom edges, respectively, and at least first and second shear planes at the inner joint, the torque box having a socket at one end thereof, wherein the socket faces forward in the vehicle and is configured to receive an end of a crush rail of the vehicle, or an adapter for the crush rail.

2. The torque box of claim 1, wherein the inner joint is formed by a ridge on at least one of the first and second clamshells, the ridge facing another of the first and second clamshells.

3. The torque box of claim 2, wherein the inner joint comprises a substantially vertical surface separating the first and second enclosures.

4. The torque box of claim 1, wherein at least a central portion of the first enclosure has a substantially rectangular cross-section, and wherein the first shear plane is formed by a bottom of the substantially rectangular cross-section.

5. The torque box of claim 1, wherein at least a central portion of the second enclosure has a substantially rectangular cross-section, and wherein the second shear plane is formed by a top of the substantially rectangular cross-section.

6. The torque box of claim 1, wherein the respective top edges of the first and second clamshells form a top joint that traverses the top shear surface.

7. The torque box of claim 6, wherein the top joint has an angle on the top shear surface.

8. The torque box of claim 6, wherein the top joint traverses the top shear surface essentially from a corner to a diagonally opposite corner.

9. The torque box of claim 1, wherein the respective bottom edges of the first and second clamshells are arced.

10. The torque box of claim 9, wherein the bottom shear plane is formed by only one of the first and second clamshells.

11. The torque box of claim 10, wherein the one of the first and second clamshells is positioned inward in the vehicle.

12. The torque box of claim 1, further comprising an additional inner plane strengthening at least one of the first and second clamshells.

13. The torque box of claim 12, wherein the additional inner plane is attached to at least one from the group consisting of: the top shear plane, the first shear plane, the second shear plane, and the bottom shear plane.

14. The torque box of claim 1, further comprising an attachment at another end thereof, the attachment configured to attach the torque box to a side sill of the vehicle.

15. The torque box of claim 1, wherein the first and second clamshells are joined at least by an adhesive at the inner joint.

16. The torque box of claim 15, wherein the first and second clamshells are joined at least by an adhesive at the respective top and bottom edges.

17. The torque box of claim 1, wherein the respective top and bottom edges comprise flanges.

18. The torque box of claim 1, wherein the first and second clamshells are cast from aluminum.

19. The torque box of claim 1, further comprising at least one additional plane, the additional plane partially traversing the first or second enclosure.

20. The torque box of claim 1, wherein the first and second enclosures are essentially parallel to each other in extending between front and ends of the torque box.

21. The torque box of claim 1, wherein the torque box has a rear end towards a side sill, wherein the first clamshell forms a first end surface facing toward the side sill in a direction, and wherein the second clamshell forms a second end surface facing toward the side sill perpendicular to the direction.

\* \* \* \* \*